Feb. 28, 1961 S. A. MYERS 2,973,013
HYDRAULIC VALVE
Filed May 15, 1956 2 Sheets-Sheet 1

INVENTOR:
Samuel A. Myers
By Herbert E. Metcalf
His Patent Attorneys

Feb. 28, 1961 S. A. MYERS 2,973,013
HYDRAULIC VALVE
Filed May 15, 1956 2 Sheets-Sheet 2
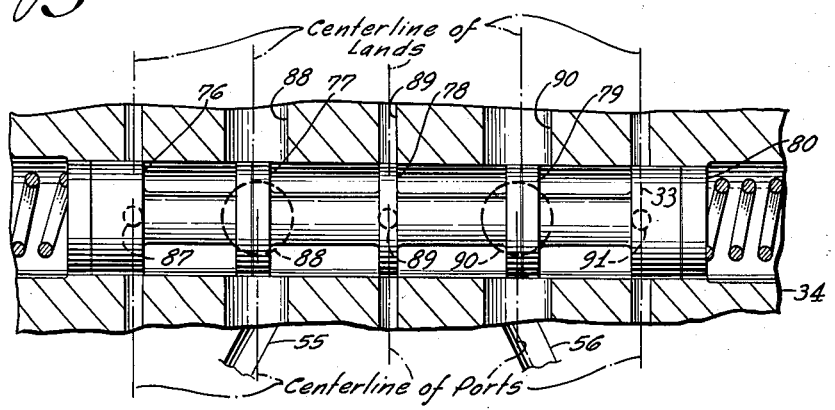
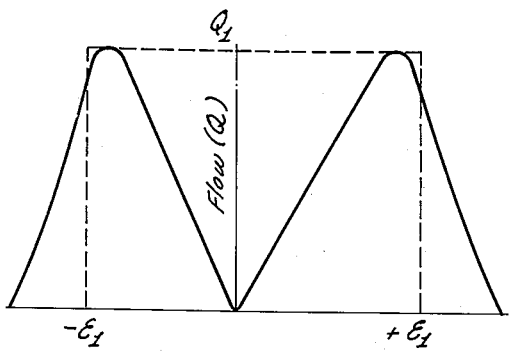
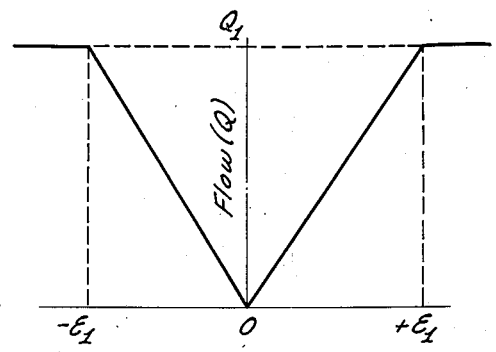
INVENTOR:
Samuel A. Myers
By Willard M. Graham
Agent

United States Patent Office 2,973,013
Patented Feb. 28, 1961

2,973,013
HYDRAULIC VALVE

Samuel A. Myers, Whittier, Calif., assignor to Northrop Corporation, Hawthorne, Calif., a corporation of California Filed May 15, 1956, Ser. No. 585,072

3 Claims. (Cl. 137—622)

This invention relates to servo apparatus and more particularly to electro-hydraulic servo apparatus including a transfer valve which functions to preclude "hard-over" failures of the apparatus.

Conventional electro-hydraulic servos are quite frequently subject to various types of failures one of the most common and objectional of which is generally referred to as a "hard-over" failure. This type of failure is usually due to "hard-over" signals which originate with mal-functioning signal apparatus. Under these conditions the servo's action is characterized in that its output member responds by assuming a "hard-over" position. The seriousness of this type of failure is apparent if, for example, the servo's output member is rigged to actuate one or more control surfaces of an aircraft, a pilotless missile or the like.

The term "hard-over" as used herein in describing servo signals refers to those signals which are of sufficient magnitude and/or of such characteristics as to cause the valve element of a transfer valve to move at a high rate to an extreme end of its operating range. From the above it follows that the terms "hard-over" as used herein in connection with the valve element of a control valve, or alternately the output member of a servo device, identifies the position of these members at such time as they are located at extreme ends of their respective operating ranges.

It is an object of this invention to provide a valve assembly for a hydraulic servo device which functions to preclude "hard-over" failures of the servo device.

Another object is to provide a valve assembly for a hydraulic servo device the valve member of which is constructed in a novel manner and cooperates with the valve housing to arrest fluid flow through the assembly in the event a "hard-over" signal is transmitted to the assembly.

Another object is to provide a valve assembly for a hydraulic servo device which is not susceptible to "hard-over" failures and in which the component parts thereof functions automatically during the operation of the assembly and which are simple in design and construction.

The characteristic features of the present invention are pointed out in the appended claims, however, the invention itself and a preferred mode of carrying it out will be better understood by referring to the following description taken in connection with the accompanying drawings forming a part of this application and in which:

Figure 3 is a fragmentary view of the transfer valve of Figure 2 on an enlarged scale showing the relation of the ports and valve lands thereof at such times as the valve's spool is in its centered position.

Figures 4 and 5 are illustrative of fluid flow through a conventional type transfer valve and transfer valve of the type disclosed herein, respectively.

Figure 1:
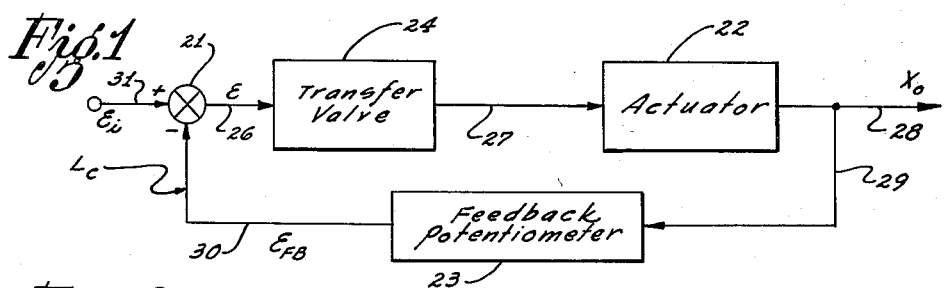
Figure 1 is a block diagram illustrative of electro-hydraulic apparatus including a transfer valve as disclosed herein.

Referring now to the drawing, Figure 1 shows in block diagram form a conventional servo system including a summing device 21, hydraulic actuator 22, feed-back potentiometer 23, and transfer valve 24 of the type disclosed herein. The above components are interconnected by electrical and mechanical means 26–30, inclusive, to provide a closed loop $L_C$.

Initial command signals $e_1$ originating outside the loop $L_C$ are transmitted to the summing device 21 through a connector 31. Here they are combined with feedback or correction signals $e_{FB}$ to provide error signals $e$ which in turn are transmitted to the transfer valve 24. The operation of the loop $L_C$ is well known in the art and further discussion in this respect is deemed unnecessary.

Figure 2:
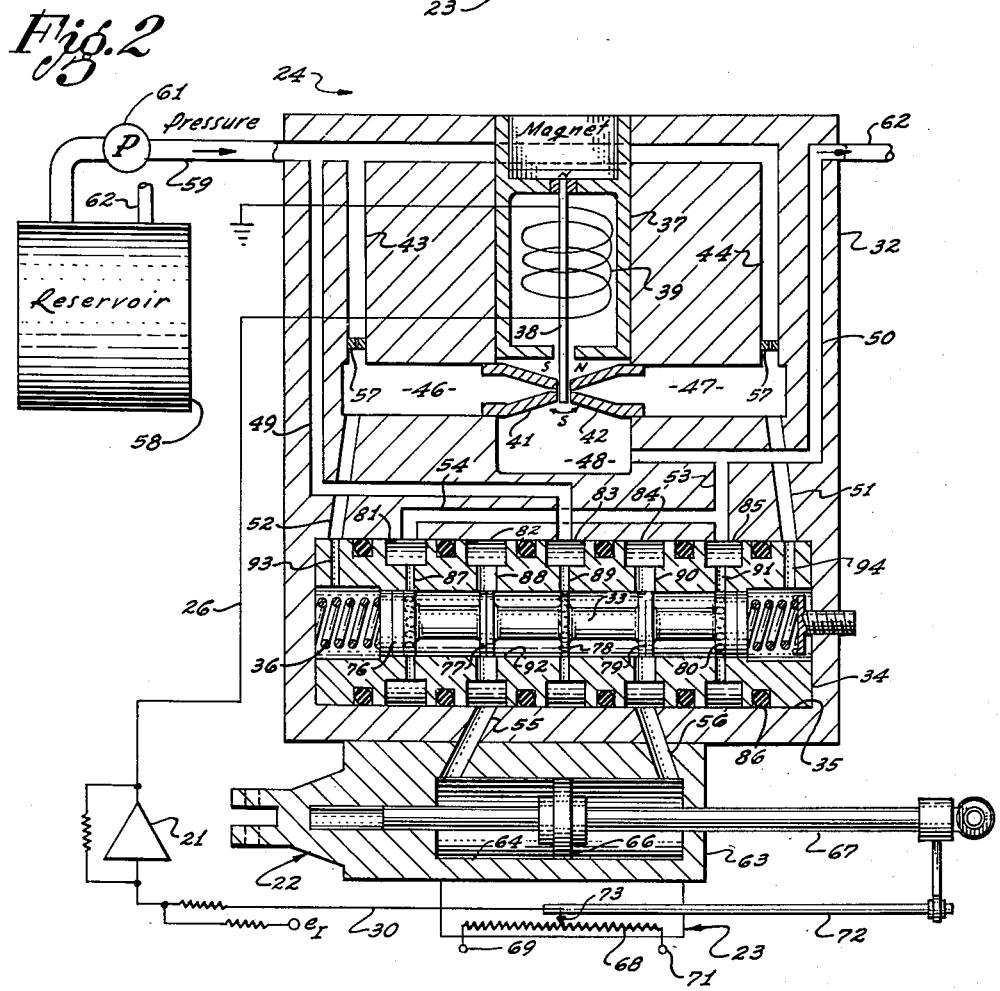
Figure 2 is a schematic cross-sectional view of a transfer valve and actuator of the type utilized in the apparatus shown in Figure 1.

The transfer valve 24 is schematically illustrated in Figure 2 together with the actuator 22 and other components of the system shown in Figure 1. The valve is of typical construction with the exception of modifications as disclosed herein which will be described in detail as the specification progresses. Conventional components of the valve 24 will not be described in detail, however, they will be identified together with a brief description of their operation.

The valve 24 consists of a housing 32 in which a valve spool 33 of the type disclosed herein is operationally mounted in a sleeve 34 which in turn is mounted in a bore 35 formed in the housing 32. The spool 33 is normally held in a neutral position within the sleeve 34 by centering springs 36. Also provided in the housing 32 is a permanent magnet 37, an elongated resilient valve member 38, and an induction coil 39. Nozzle members 41 and 42 are spaced equal distances on each side of the valve member 38. Passages 43, 44, and 49–56, inclusive, opposed bores 46 and 47, and exhaust chamber 48 provide means for the passage of fluid through the housing 32. The passages 43, 44, and 49–56, inclusive, are hereinafter referred to as follows: passages 43 and 44 as secondary inlet passages, passage 49 as a primary inlet passage, 50 as a secondary outlet passage, 51 and 52 as auxiliary passages, 53 and 54 as primary outlet passages, and 55 and 56 as transfer passages.

Identical restrictor elements 57 are located in each of the secondary inlet passages 43 and 44. The passages 43, 44, and 49 juncture at a location upstream of the restrictors 57 and communicate with a reservoir 58 via a conduit 59 having a pump 61 located therein. The passage 50 also communicates with the reservoir 58 via a return conduit 62.

The actuator 22 is fixedly secured to the valve 24 and consists of a housing 63 having a chamber 64 formed therein and in which a piston 66 and rod 67 are operationally mounted.

The potentiometer 23 includes a resistor element 68 the end leads 69 and 71 of which are connected to the poles of a D.C. voltage source (not shown). The arm 72 of the potentiometer 23 is attached to the output rod 67 of the actuator and displaces the contact member 73 thereof directly in accordance with movements of the output rod 67. The connector 30 transmits feedback signals to the summing device 21.

The spool 33 and sleeve 34 of the transfer valve, as shown in Figure 2, cooperate in a novel manner to preclude failures of the aforementioned "hard-over" type. The outside diameter of the sleeve 34 provides a snug fit in the bore 35 while its inner surface is lapped to receive the spool 33 having lands 76–80, inclusive, which provide a fluid tight sliding fit with the sleeves inner surface or bore 92. The land 78, located midway between the ends of the spool 33, is hereinafter referred to as a primary land, the lands 77 and 79 as secondary lands, and the lands 76 and 80 as auxiliary lands. Longitudinally spaced annular grooves 81–85, inclusive, are provided in the outer peripheral portion of the sleeve 34. Conventional O-rings 86 are utilized to restrict fluid flow between the grooves 81–85, inclusive, and also from the ends of the sleeve 34. With the sleeve 34 positioned in the bore 35 the primary inlet passage 49 is in communication with the groove 83, primary outlet passages 54 and 53 are in communication with the grooves 81 and 85, respectively, and transfer passages 55 and 56 are in communication with the grooves 82 and 84, respectively.

Radially extending bores 87–91 inclusive, provide fluid communication between the grooves 81–85, inclusive, and the longitudinally extending bore 92 in which the spool 33 operates. The bores 87 and 91 are hereinafter referred to as auxiliary bores, the bores 88 and 90 as secondary bores, and the bores 89 as primary bores. The grooves 82 and 84 and the bores 88 and 90 are located equal distances respectively on each side of the groove 83 and bores 89. Likewise the grooves 81 and 85 and bores 87 and 91 are also located equal distances respectively on opposite sides of the groove 83 and bores 89 and outboard of the bores 88 and 90. Radial bores 93 and 94, formed in the sleeve 34 and located outboard with respect to the grooves 81 and 85, provide fluid communication between the passages 52 and 51 and the longitudinal bore 92 of the sleeve 34.

With the valve spool 33 in its neutral position, as shown in Figures 2 and 3, the side faces of the primary land 78 spans the bores 89 but does not extend any appreciable distance therebeyond. The secondary lands 77 and 79 are located respectively equal distances on each side of the land 78. The locations of the lands 77 and 79 are further characterized in that they only partially close the secondary passages 88 and 90 leaving segment shaped opening of predetermined area on each side thereof. Further the secondary lands 77 and 79 are located, with respect to the bores 88 and 90, so that the segment shaped openings on the inboard sides of the lands 77 and 79 are of greater area than the segment shaped opening on the outboard side of these lands. In other words, at such times as the spool 33 is in its neutral position in the sleeve 34, the central plane of the land 78 coincides with the axes of the primary bores 89 while the central planes of the secondary lands 77 and 79 are located respectively a small distance outboard with respect to the axes of the bores 88 and 90. Also the inner faces of the auxiliary lands 76 and 80 are substantially respectively aligned with the innermost peripheral edge of the auxiliary bores 87 and 91. It is to be understood that the sleeve 34 is not necessary and may be eliminated if desired. In this event the passages 49 and 51–56, inclusive, will enter the bore 35 substantially in a radial direction and will be symmetrical about the longitudinal axes thereof as they enter the bore 35.

The component parts of the valve having been described its novel features will become more apparent from the following discussion of its operation.

Under normal operating conditions signals are not originated and transmitted to the valve 24 which will result in "hard-over" movements of the spool 33. For example, assume a normal signal is received by the coil 39 causing the spool 33 to move a predetermined distance to the right. This movement, however, is not sufficiently great to cause the land 77 to block the flow of pressurized fluid to the chamber 64 or to cause the land 79 to arrest fluid flow therefrom. Under these conditions the piston 66 and rod 67 are moved to the right until such time as the spool 33 is returned to its neutral position in a conventional manner. If, however, the signaling apparatus malfunctions and a "hard-over" signal is transmitted to the coil 39 the spool 33 responds by moving through its maximum travel to one end of its range. Upon such a pronounced movement of the spool 33 to the right the land 79 will first arrest flow from the actuator chamber 64 through the bores 90. Subsequently the land 77 will arrest the flow of pressurized fluid to the chamber 64 through the bores 88. Because of the specific construction of the spool 33 and sleeve 34 it will be noted that the land 79 arrests fluid flow from the right side of the chamber 64, through the bores 90, before the land 77 completely arrests the flow of pressurized fluid to the left side of the chamber 64 through the bores 88. It will also be noted that upon pronounced movement of the spool 33 to the left from its centered position a similar sequence of closing of the ports 88 and 90 occurs. However, in this latter instance the land 77 will first function to arrest fluid flow from the port 88 and subsequently the land 79 will function to arrest fluid flow entering the port 90.

It will now be seen that pressurized fluid at system pressure will be locked in the chamber 64 at such times as there is a pronounced movement of the spool 33, either to the right or left, from its centered position. This would not necessarily be the case should the lands 77 and 79 have respective symmetrical relations with respect to the ports 88 and 90. If for any reason, for example due to tolerances allowed in manufacturing and the like, the location of the lands 77 and 79 are such that, upon pronounced movement of the spool 33 to the right from its centered position, then the port 88 may be closed to the flow of pressurized fluid before the exit port 90 is closed by the land 79. Under these conditions a "mushing" or unfilled condition may occur in the chamber 64. Therefore, the chamber 64 will not necessarily be filled with pressurized fluid and the aforementioned "mushing" condition may be present in the chamber 64. Accordingly it will now be apparent, in structure of the type disclosed in the present specification, that the piston 66 will be locked after slight travel under the application of system pressure until such time as the aforementioned "hard-over" signal is removed.

The action of the valve may be better understood by referring to Figures 4 and 5 in which typical fluid flow through a conventional valve and a valve as shown in Figure 2 is respectively illustrated. When the valve as disclosed herein is utilized in a closed-loop servo system, as shown in Figure 1, the operation of the system will be completely conventional as long as the magnitude of the error signal $\pm\epsilon$ (i.e. the signal transmitted to the coil 39) is below some predetermined value $\pm\epsilon_1$ (Figure 4). The magnitude of the error signal is established so that during the normal operation of the system the value $\pm\epsilon_1$ is never exceeded.

If for any reason the error signal $\epsilon$ is of greater magnitude than the value $\pm\epsilon_1$ a "hard-over" failure exists. At this time, however, the spool 33 tends to go "hard-over" and the total range of the flow curve is traversed with the end flow being zero as shown in Figure 5. Since the flow curve during this time has gone from zero flow, through maximum flow, and back to zero flow the piston 66 is displaced very little and is then arrested. As previously mentioned the piston 66 and rod 67 will remain in their respective stopped or locked positions until such time as the "hard-over" signal is removed. This would not be the case in connection with a conventional spool not provided with the secondary lands 77 and 79. Here fluid flow to the actuator chamber 64 would continue in accordance with the curve shown in Figure 4.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. In a hydraulic servo valve assembly the combination comprising: a housing having a cylindrical valve chamber formed therein; an elongated valve spool including a primary land, a pair of secondary lands and a pair of auxiliary lands; said valve spool being slideably mounted in said chamber for bi-directional movement between a centered and a plurality of non-centered positions; portions of said housing defining a fluid inlet passage, a pair of fluid outlet passages and a pair of fluid motor passages; inner ends of said inlet, outlet and motor passages opening into said chamber; said lands being positioned on said valve spool so that said primary land closes said inlet passage, said auxiliary lands close said outlet passages and said secondary lands partially close said motor passages at such times as said valve spool is in said centered position; and means for moving said valve spool between said centered and non-centered positions.

2. In a hydraulic servo valve assembly the combination comprising: a housing having a cylindrical valve chamber formed therein; an elongated valve spool having an auxiliary land at each end thereof and a primary land positioned midway between said auxiliary lands; said valve spool being further characterized by including a pair of secondary lands positioned respectively between said primary land and each of said auxiliary lands; each of said lands being of disc-like configuration and said valve spool being slideably mounted in said chamber for bi-directional movement between a centered and a plurality of non-centered positions; portions of said housing defining a fluid inlet passage, a pair of fluid outlet passages and a pair of fluid motor passages; inner ends of said inlet, outlet and motor passages terminate and open into said chamber to provide respective inlet, outlet and motor ports which are symmetrical with respect to the axes of the passages which they terminate; said primary land closes said inlet port; said auxiliary lands close said outlet ports and said secondary lands partially close said motor passages at such times as said valve spool is in said centered position; and means for moving said valve spool between said centered and non-centered positions.

3. In a hydraulic servo valve assembly the combination set forth in claim 2: further characterized in that said inlet, outlet and motor ports are circular; the center of said inlet port lies in the central plane of said primary land, the center of said motor ports are located inboard respectively with respect to the central planes of said secondary lands and the innermost side faces of said auxiliary lands are respectively aligned with the innermost peripheral edge of said outlet ports at such times as said valve spool is located in said centered position.

References Cited in the file of this patent

UNITED STATES PATENTS

| 2,621,676 | Taft | Dec. 16, 1952 |
| 2,767,689 | Moog | Oct. 23, 1956 |
| 2,790,427 | Carson | Apr. 30, 1957 |
| 2,872,943 | Easter | Feb. 10, 1959 |

FOREIGN PATENTS

| Z2900 Ia/60 | Germany | Sept. 1, 1955 |